United States Patent
Russell, Jr. et al.

(10) Patent No.: US 6,313,836 B1
(45) Date of Patent: *Nov. 6, 2001

(54) THREE DIMENSIONAL MODEL WITH THREE DIMENSIONAL POINTERS AND MULTIMEDIA FUNCTIONS LINKED TO THE POINTERS

(75) Inventors: Sanford H. Russell, Jr., San Mateo; Douglas S. Dennis, San Jose; Richard J. Carey, Los Altos, all of CA (US)

(73) Assignee: Silicon Graphics, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/601,551

(22) Filed: Feb. 14, 1996

Related U.S. Application Data

(63) Continuation of application No. 08/269,444, filed on Jun. 30, 1994, now Pat. No. 5,526,478.

(51) Int. Cl.[7] .............................. G06F 15/00; G06T 15/00
(52) U.S. Cl. ..................... 345/419; 707/500.1; 707/512; 345/145
(58) Field of Search ................................ 395/154, 773, 395/806, 807, 119, 349, 339; 345/419, 145; 707/512

(56) References Cited

U.S. PATENT DOCUMENTS

| | | | |
|---|---|---|---|
| 4,601,003 | 7/1986 | Yoneyama et al. | 395/351 |
| 4,813,013 | 3/1989 | Dunn | 395/333 |
| 4,901,221 | 2/1990 | Kodosky et al. | 395/348 |
| 4,914,568 | 4/1990 | Kodosky et al. | 395/349 |
| 5,019,809 | 5/1991 | Chen | 340/815.42 |
| 5,134,560 | * 7/1992 | Ferriter et al. | 395/159 |
| 5,148,154 | 9/1992 | MacKay et al. | 345/119 |
| 5,179,656 | * 1/1993 | Lisle | 395/159 |
| 5,230,063 | 7/1993 | Hoeber et al. | 395/354 |

(List continued on next page.)

OTHER PUBLICATIONS

Woolsey, "Multimedia Scouting", IEEE Computer Graphics & Applications, pp. 26–38, Jul. 1991.*

Gregory M. Nielson, et al., "Direct Manipulation Techniques for 3D Objects Using 2D Locator Devices," *Workshop on Interactive 3D Graphics*, pp 175–182, Oct. 23–24, (1986).

*Quattro Pro Version 2.0 User's Guide*, Borland Int'l, Inc, pp 415–431, (1990).

Vu/Post Users Manual, SPATIALUtilities, Inc., pp 26–34 (1987).

*Primary Examiner*—Heather R. Herndon
*Assistant Examiner*—J. R. Burwell
(74) *Attorney, Agent, or Firm*—Blakely, Sokoloff, Taylor & Zafman

(57) ABSTRACT

A computer implemented method of annotating a geometric figure displayed and manipulable in three-dimensional representation on a display of a computer system with a pointer is described. The pointer is also displayed and manipulable in three-dimensional representation on the display. The method associates multimedia functions with the geometric figure. The pointer is positioned to point at an area of the geometric figure using a control device. The geometric figure is displayed in a particular view orientation when the pointer points at the area of the geometric figure. The pointer is then oriented three-dimensionally such that the pointer can point at the area of the geometric figure at a desired angle. The particular view orientation of the geometric figure with the pointer can be preserved such that the particular view orientation of the geometric figure with the pointer can later be retrieved. The pointer can be activated by attaching a marker to the pointer using the control device. When the pointer is activated, the pointer can be associated with a multimedia function such that when the pointer is again activated, the multimedia function is executed.

11 Claims, 11 Drawing Sheets

U.S. PATENT DOCUMENTS

| | | | | |
|---|---|---|---|---|
| 5,386,568 | * | 1/1995 | Wold et al. | 395/700 |
| 5,388,264 | * | 2/1995 | Tobias, II et al. | 395/159 |
| 5,414,806 | * | 5/1995 | Richards | 395/159 |
| 5,524,193 | * | 6/1996 | Covington et al. | 395/773 |
| 5,537,526 | * | 7/1996 | Anderson et al. | 395/777 |
| 5,537,529 | * | 7/1996 | Borovoy et al. | 395/601 |
| 5,544,302 | * | 8/1996 | Nguyen | 395/326 |
| 5,559,942 | * | 9/1996 | Gough et al. | 395/349 |

\* cited by examiner

FIG. 8  3-D HIERARCHICAL DATA STRUCTURE

THREE DIMENSIONAL MODEL WITH THREE DIMENSIONAL POINTERS AND MULTIMEDIA FUNCTIONS LINKED TO THE POINTERS

This is a continuation of application Ser. No. 08/269,444, filed Jun. 30, 1994, now U.S. Pat. No. 5,526,478.

FIELD OF THE INVENTION

The present invention pertains to the field of computer systems. More particularly, this invention relates to a computer-controlled system for annotating a three-dimensionally displayed and manipulable model and for linking multimedia functions to the annotated model by means of three-dimensional pointers.

BACKGROUND OF THE INVENTION

The advance in computer graphics have extended the range of capabilities for users. Objects or models can now be displayed in three-dimensional ("3-D") representation on a computer-controlled display system, for example, in wireframe, solid, and/or shaded forms. FIG. 1 shows a prior art computer-controlled display system 10 that displays an object 11 in 3-D form.

Manipulation of the displayed 3-D objects or models is typically achieved utilizing 3-D or two-dimensional input controllers, such as cursor control devices. The displayed 3-D model can be moved and/or rotated on the display by the input controller. This allows the user to view the 3-D model from various perspective views.

Disadvantages are, however, associated with such prior art arrangement. One disadvantage is that the user typically cannot link information to the displayed 3-D model electronically. Typically, when such a need arises, the displayed 3-D model is printed on a sheet of paper. The user then makes an indication mark near an area of interest of the model on the paper to associate information to the marked area. The information can be a text on the same sheet of paper or on a different sheet of paper, or graphics on a separate sheet of paper. This typically causes inconvenience for viewers of the 3-D model to exchange information with respect to the model. In addition, because information cannot be linked to the 3-D model electronically, the viewers of the model typically have to communicate with each other in an inefficient manner.

Another disadvantage is that it is typically difficult for viewers of the displayed 3-D model at various locations to exchange information with respect to the 3-D model in a consistent environment. For example, because information cannot be electronically linked to the 3-D model. When a viewer wants to exchange information with respect to the 3-D model with another viewer at a remote location, the viewer who initiates the exchange (i.e., the sender) has to send the model and the information separately to the receiving viewer (i.e., the receiver). When the receiver receives the 3-D model and the related information, the receiver may not view the 3-D model with the information in the same manner as desired by the sender. This inconsistency may cause misunderstanding and miscommunication between the sender and the receiver with respect to the 3-D model and the information.

SUMMARY AND OBJECTS OF THE INVENTION

One of the objects of the present invention is to allow exchange of information with respect to a 3-D model displayed on a display system.

Another object of the present invention is to allow multimedia functions to be linked to a 3-D model displayed on a display system.

Another object of the present invention is to allow a 3-D model displayed on a display system to be annotated by means of 3-D pointers.

Another object of the present invention is to provide a 3-D model with a sequence of representations that are linked with a pointer associated with the 3-D model, wherein when the pointer is activated, the 3-D model changes its representation in accordance with the sequence of representations.

A further object of the present invention is to allow a specific view representation (including, specific view orientation, display attribute (e.g., color), geometric transformation (e.g., rotation), and display form (e.g., wireframe)) of a 3-D model annotated with 3-D pointers to be preserved such that viewers of the model can communicate with each other with respect to the model in a consistent environment.

A computer implemented method of annotating a geometric figure displayed and manipulable in three-dimensional representation on a display of a computer system is described. A three dimensionally displayed and manipulable pointer is positioned to point at an area of the geometric figure using a control device. The geometric figure is displayed in a particular view orientation when the pointer is positioned to point at the geometric figure. The pointer is then oriented three-dimensionally such that the pointer can point at the area of the geometric figure at a desired angle. The particular view orientation of the geometric figure with the pointer is then preserved such that the particular view orientation of the geometric figure with the pointer can later be retrieved.

A computer implemented method of associating multimedia functions with a geometric figure displayed and manipulable in three-dimensional representation on a display of a computer system is described. A pointer is positioned to point at an area of the geometric figure using a control device. The pointer is also displayed and manipulable in three-dimensional representation on the display. The pointer is activated by attaching a marker to the pointer using the control device. When the pointer is activated, the pointer can be associated with a multimedia function such that when the pointer is again activated, the associated multimedia function is executed.

A computer-controlled display system is also described. The display system includes a processor, a display coupled to the processor, and a memory coupled to the processor for storing data. The memory stores a first data for displaying a geometric object on the display three-dimensionally. The memory also stores a second data for displaying a pointer on the display. The second data is linked to the first data. The second data is also linked to a multimedia function. When the processor accesses the memory for the first data, the first and second data are obtained by the processor from the memory to display the geometric figure with the pointer pointing at the geometric figure on the display. When the pointer is activated, the processor accesses the memory for the multimedia function via the second data.

Other objects, features, and advantages of the present invention will be apparent from the accompanying drawings and from the detailed description that follows below.

BRIEF DESCRIPTION OF THE DRAWINGS

The present invention is illustrated by way of example and not limitation to the figures of the accompanying drawings, in which like references indicate similar elements and in which.

DETAILED DESCRIPTION

The present description includes material protected by copyrights, such as illustrations of graphical user interface images which the assignee of the present invention owns. The assignee hereby reserves its rights, including copyright, in these materials, and each such material should be regarded as bearing the following notice; Copyright Silicon Graphics, Inc., 1993. The copyright owner has no objection to the facsimile reproduction by anyone of the patent document or the patent disclosure, as it appears in the Patent and Trademark Office file or records, but otherwise reserves all copyrights whatsoever.

Figure 2:
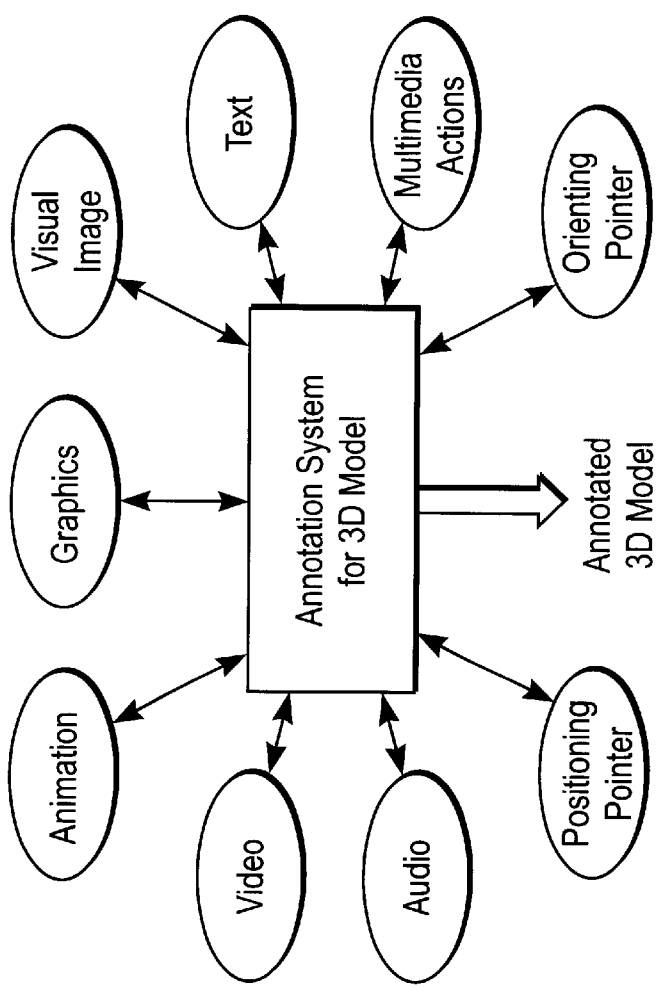
FIG. 2 is a conceptual illustration of an annotation system of a computer-controlled display system for annotating and linking multimedia functions to a 3-D model in accordance with one embodiment of the present invention.
Figure 1:
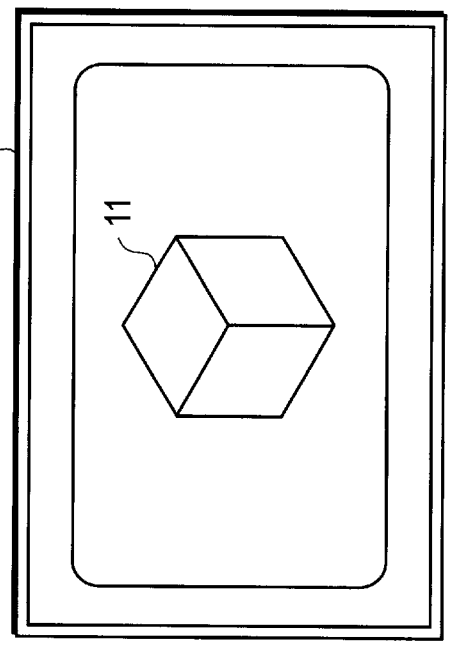
FIG. 1 illustrates a prior art computer-controlled display system that displays a model in 3-D representation.

Referring to FIG. 2, the annotation system for annotating and linking multimedia functions to a 3-D model according to one embodiment of the present invention is conceptually illustrated, As can be seen from FIG. 2, the annotation system electronically links various multimedia actions and/or data such as text, graphics, 3-D models, visual image, animation, video, and audio information to a 3-D model displayed on a computer-controlled display system.

As will be described in more detail below, the annotation system, which is embodied in an interactive user interface of the computer-controlled display system, annotates the 3-D model by means of a pointer associated with the 3-D model: The annotation system then activates the pointer by attaching a marker to the pointer. The annotation system then links a multimedia function to the activated pointer. The pointer can then be deactivated by removing the marker from the pointer such that when the pointer is again activated, the linked multimedia function is executed. The multimedia function can be a function of displaying a multimedia information or performing a multimedia action. As can be seen from FIG. 2, the multimedia information can include 3-D object, text, visual image, graphics, animation, video, and audio information. The multimedia action can be an action to execute a program, or an action to perform certain functions. For example, the multimedia action may be an action to change a page of a document displayed, an action to dial a telephone number, an action to change the view representation or geometric transformation of the 3-D object, or an action to record an image. Moreover, the multimedia action may be an action to preserve a particular view orientation of the 3-D model displayed, or to display a sequence of representations of the 3-D model, or to change the display representation of the 3-D model. Furthermore, the multimedia action may be an action to orient the pointer at a desired angle with respect to the 3-D model displayed.

Figure 3:
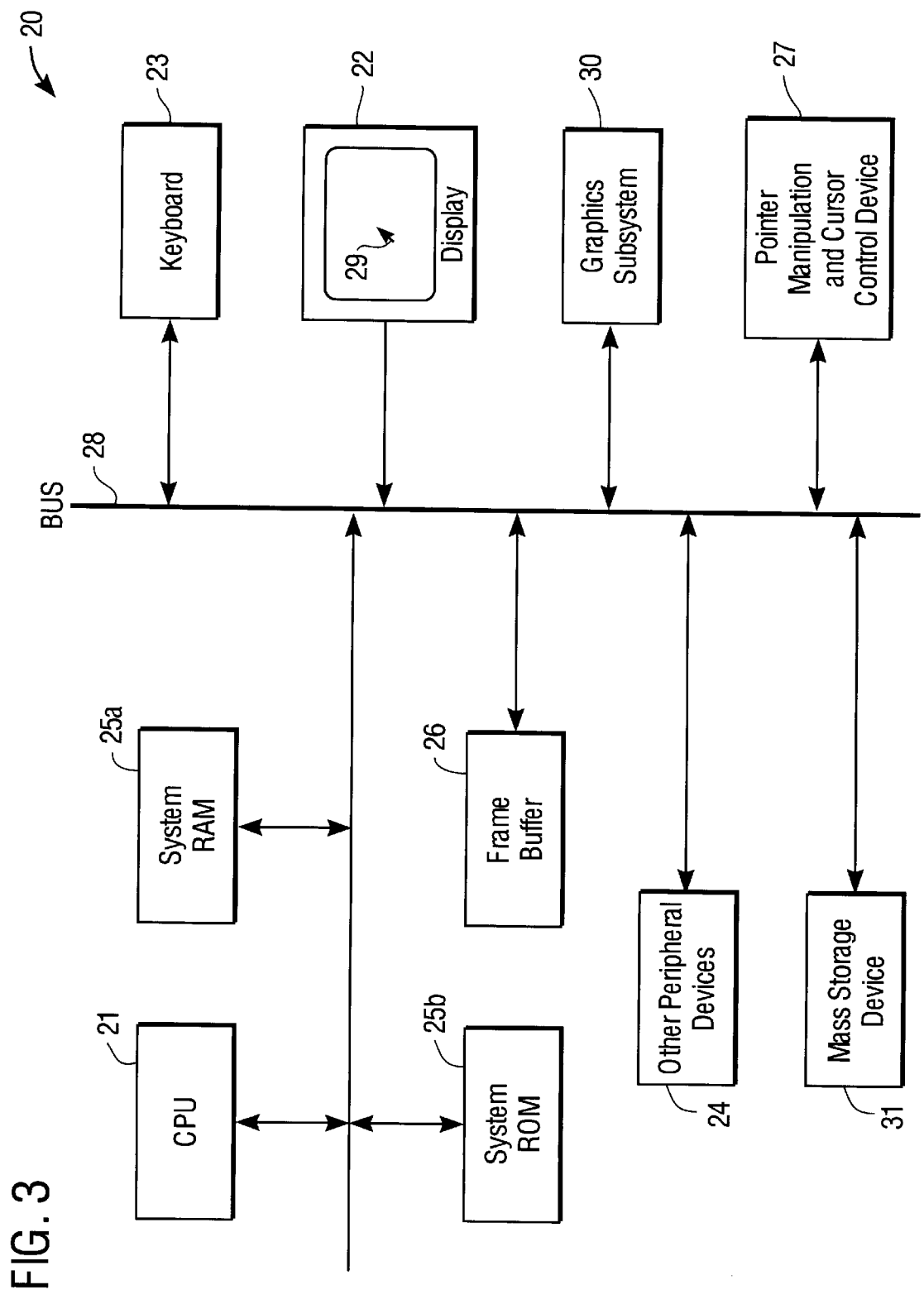
FIG. 3 is a block diagram of the computer-controlled display system that implements the annotation system in accordance with one embodiment of the present invention.

FIG. 3 illustrates a computer-controlled display system 20 that includes the annotation system of FIG. 2 in accordance with one embodiment of the present invention. Computer-controlled display system 20 is a graphics computer system that can process and display images or models in 3-D representation. In essence, computer-controlled display system 20 is a computer system. For one embodiment, computer system 20 is an IRIS® workstation computer system manufactured by Silicon Graphics, Inc. of Mountain View, Calif. For another embodiment, computer system 20 is an INDIGO™ computer system also manufactured by Silicon Graphics, Inc.

Computer system 20 of FIG. 3 operates in multimedia environment and supports integrated digital media and interactive 3-D graphics and models. Computer system 20 includes a central processing unit ("CPU") 21 connected to a bus 28. Computer system 20 also includes a display 22 and a keyboard 23 connected to bus 28. Bus 28 is also connected to a system random access memory ("RAM") 25a and a system read-only memory ("ROM") 25b. A frame buffer 26 is connected to bus 28. Frame buffer 26 stores the information to be displayed on display 22.

Computer system 20 also includes a pointer manipulation and cursor control device 27. Pointer manipulation and cursor control device 27 is used in computer system 20 to permit a user to selectively position a cursor 29 at any desired location on display 22. In addition, pointer manipulation and cursor control device 27 allows the user to select various command modes, input control signals, and generate 3-D pointers for a 3-D model on display 22. Control device 27 includes a number of signal generation devices for input control signals to system 20.

Computer system 20 includes a mass storage device 31 and other peripheral devices 24. Mass storage device 31 can be hard disk storage or an electrically erasable and programmable memory card. The other peripheral devices 24 may include a printer, a modem, a scanner, and a local area network ("LAN") controller.

For one embodiment, computer system 20 is equipped with audio and video recording and playback capabilities. In this case, the other peripheral devices 24 include a microphone, a speaker, and a video camera.

Computer system 20 also includes a graphics subsystem 30. Graphics subsystem 30 is coupled to bus 28. Graphics subsystem 30 communicates with CPU 21 and frame buffer 26 via bus 28. For one embodiment, graphics subsystem 30 is implemented to embody frame buffer 26.

Graphics subsystem 30 is used to generate pixel data of images displayed on display 22. The pixel data are stored in frame buffer 26 and are then used to drive display 22.

Graphics subsystem 30 includes storage elements, graphics processing elements for processing graphics data that are to be displayed on display 22. For one embodiment, graphics subsystem 30 includes four pipelined subsystems: (1) a geometry subsystem, (2) a scan conversion subsystem, (3) a raster subsystem, and (4) a display subsystem. When a 3-D model needs to be displayed on display 22. CPU 21 accesses system RAM and ROM 25a and 25b and mass storage device 29 for data relating to the visual description of the 3-D model. The visual description of the 3-D model is read and stored in computer system 20. For one embodiment, the visual description of the 3-D model is read and stored in computer system 20 by an INVENTOR software package manufactured by Silicon Graphics, Inc. of Mountain View, Calif. The INVENTOR software can be loaded into computer system 20 and run on CPU 21. Alternatively, other known graphics. software packages can be employed to input the visual description data of the 3-D model into computer system 20.

Figure 8:
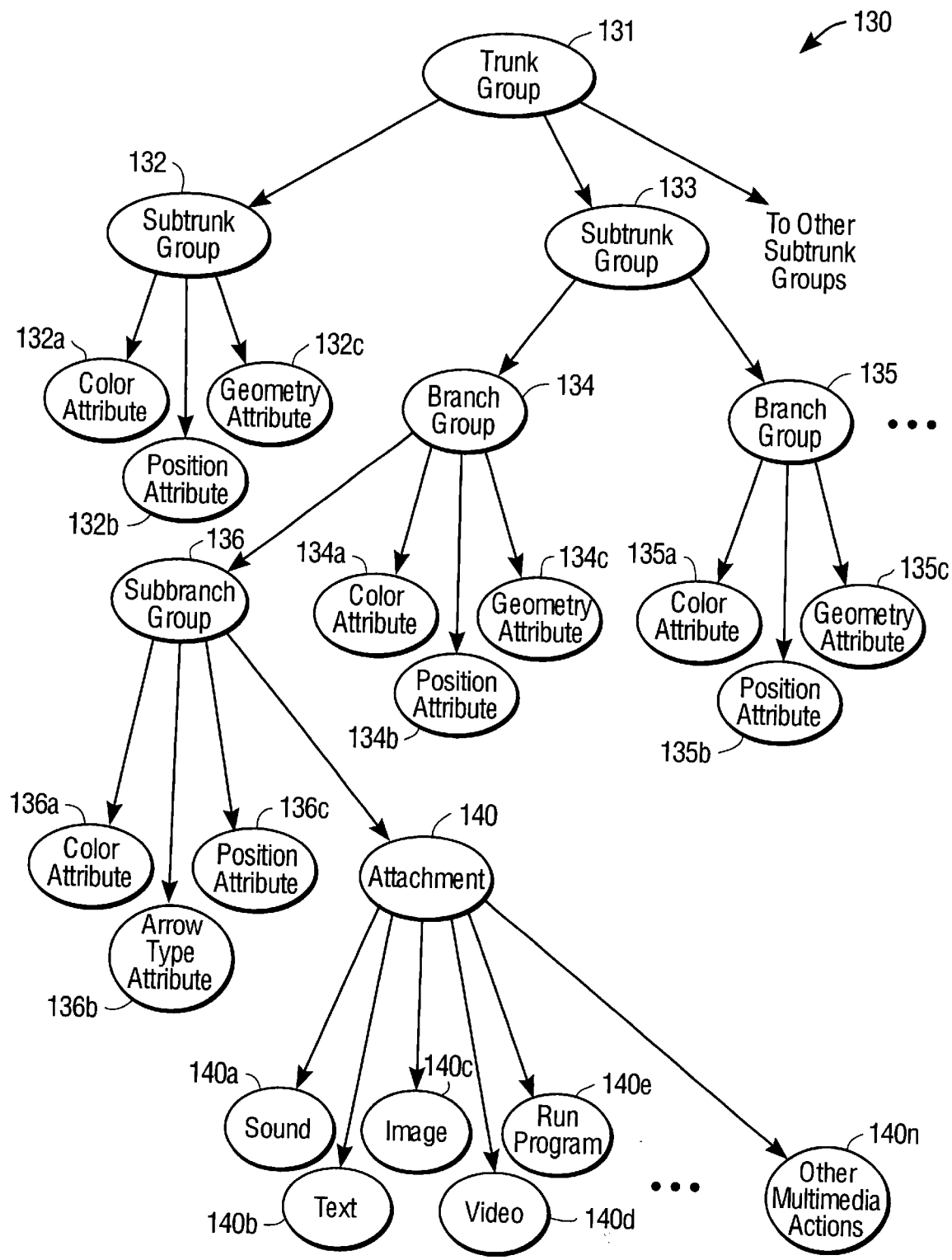
FIG. 8 illustrates the data structure of an annotated 3-D model annotated by the annotation system, wherein the data structure of the annotated model is stored in the display system of FIG. 3.

CPU 21 assembles the visual description data of the 3-D model and sends the data to graphics subsystem 30 via bus 28. The visual description data includes position, geometry, and color attributes of the 3-D model. FIG. 8 illustrates the data structure of the visual description data of a 3-D model, which will be described in more detail below. As can be seen from FIG. 8, the 3-D model is an annotated model with multimedia functions linked, which will also be described in more detail below.

The data supplied by CPU 21 are then processed by the four above-mentioned subsystems of graphics subsystem 30. The geometry subsystem receives the visual description data and converts them into screen-space data. The screen-space data define the geometrical positions and colors of the 3-D model in a screen coordinate system corresponding to the visual plane of display 22. The scan conversion subsystem of graphics subsystem 30 then breaks down points, lines, polygons, and meshes, thereby producing pixel data. The pixel data are then sent to raster subsystem of graphics subsystem 30 for various blending or texturing functions. The processed pixel data are then written into frame buffer 26. The display subsystem of graphics subsystem 30 then reads the processed pixel data from frame buffer 26 and displays the image on display 22.

For one embodiment, frame buffer 26 is formed by DRAMs that can store up to four megabits of data such that a high-resolution frame buffer is constructed with configurations ranging from 256 through 1024 bits per pixel. This high capacity allows storage of color, depth, and numerous other special-purpose data fields to support advanced rendering features.

Figure 9:
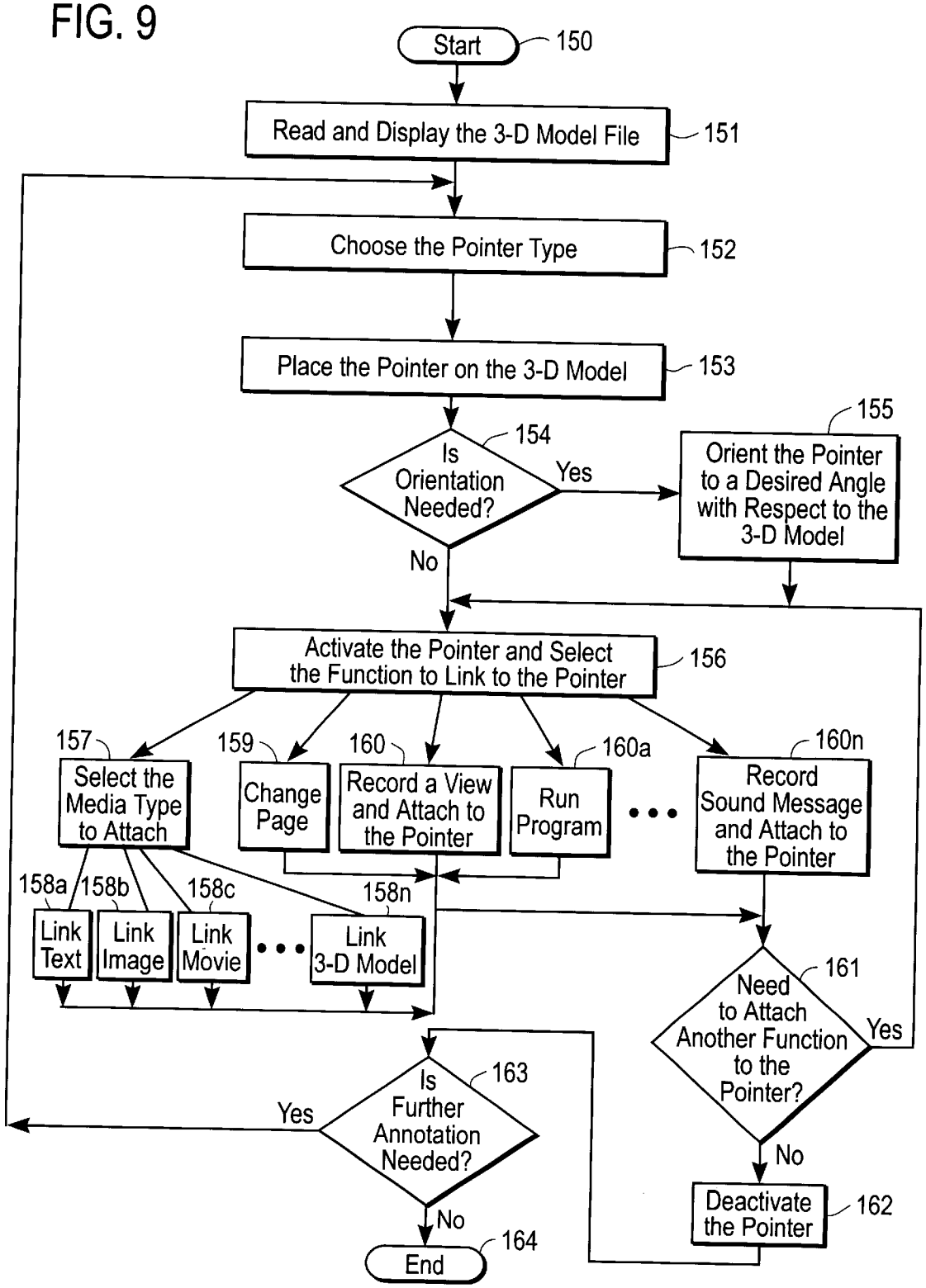
FIG. 9 is a flow chart diagram of the process performed by the annotation system to annotate a 3-D model and link multimedia functions to the annotated model.
Figure 10:
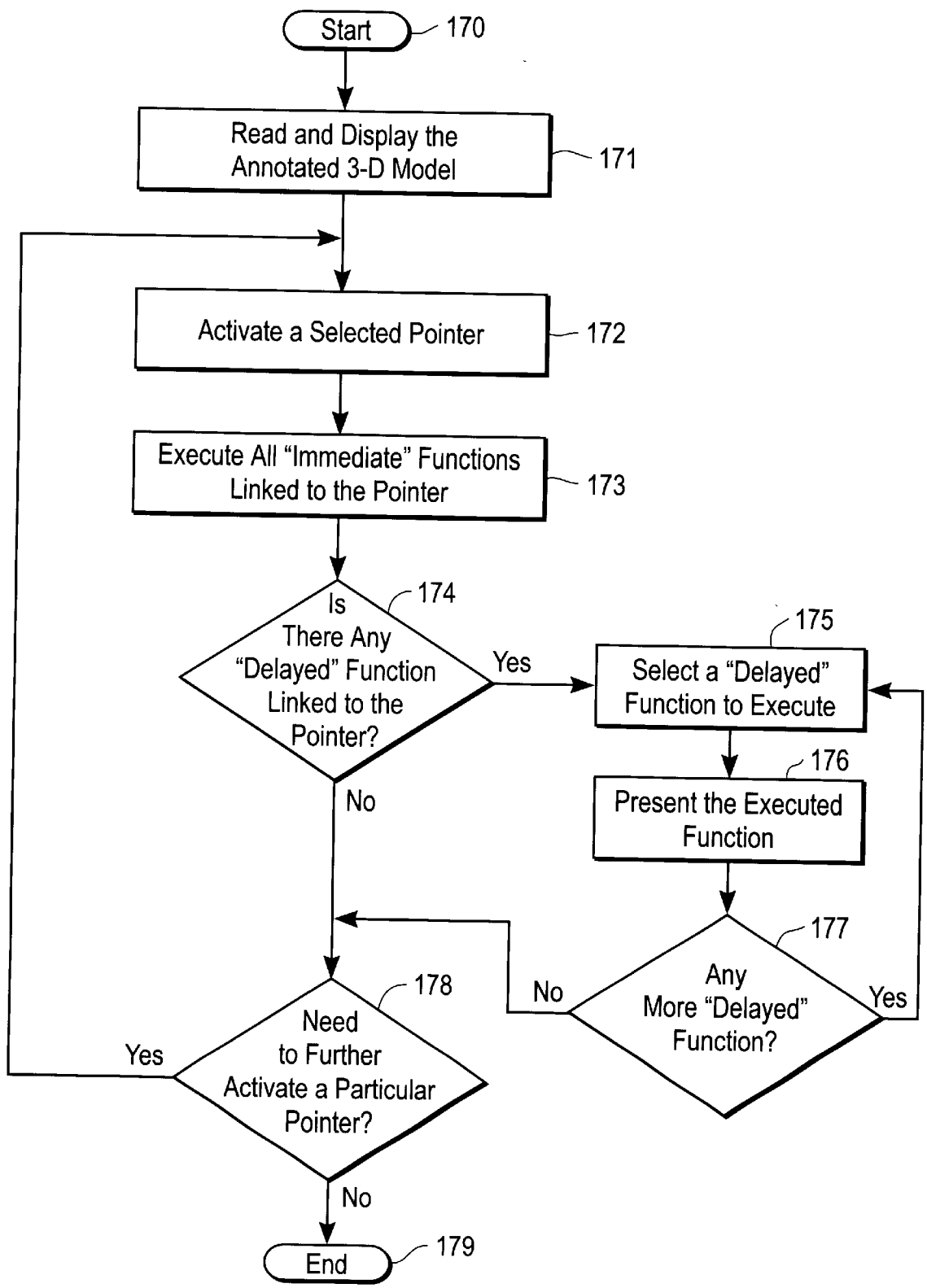
FIG. 10 is a flow chart diagram of the process of displaying the annotated model and executing the multimedia functions linked to the annotated model, wherein the process is also performed by the annotation system.

FIG. 3 does not show the annotation system of the present invention. The functions of the annotation system are achieved by software programs running in the hardware environment of computer system 20 as described above and shown in FIG. 3. FIGS. 4A through 7 show the annotation system of the present invention through the user interface of the annotation system of the present invention. FIGS. 9 and 10 show the processes of the annotation system of the present invention that are executed in computer system 20. Alternatively, the annotation system of the present invention may be implemented by other means, for example, by hardware circuits.

As will be described in more detail below, the annotation system of computer system 20 links visual description data of a pointer to the data file of a 3-D model. The annotation system then links data of a selected multimedia function to the visual description data of the pointer. FIG. 8 shows the data structure of the annotated 3-D model with multimedia functions linked, which will be described in more detail below.

Figure 4A:
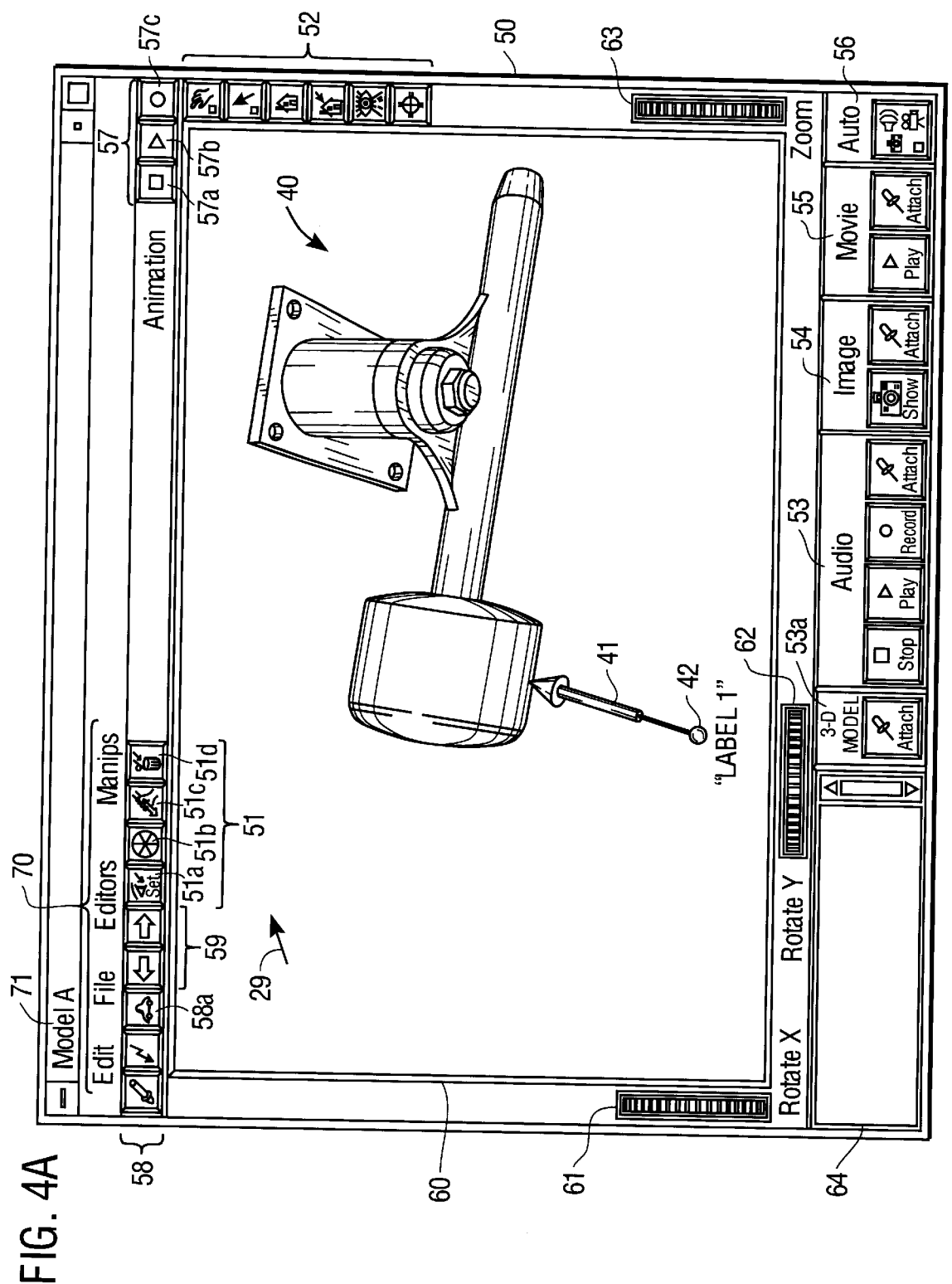
FIGS. 4A through 7 illustrate the use of the annotation system of the display system of FIG. 3 to annotate a 3-D model.
Figure 4B:
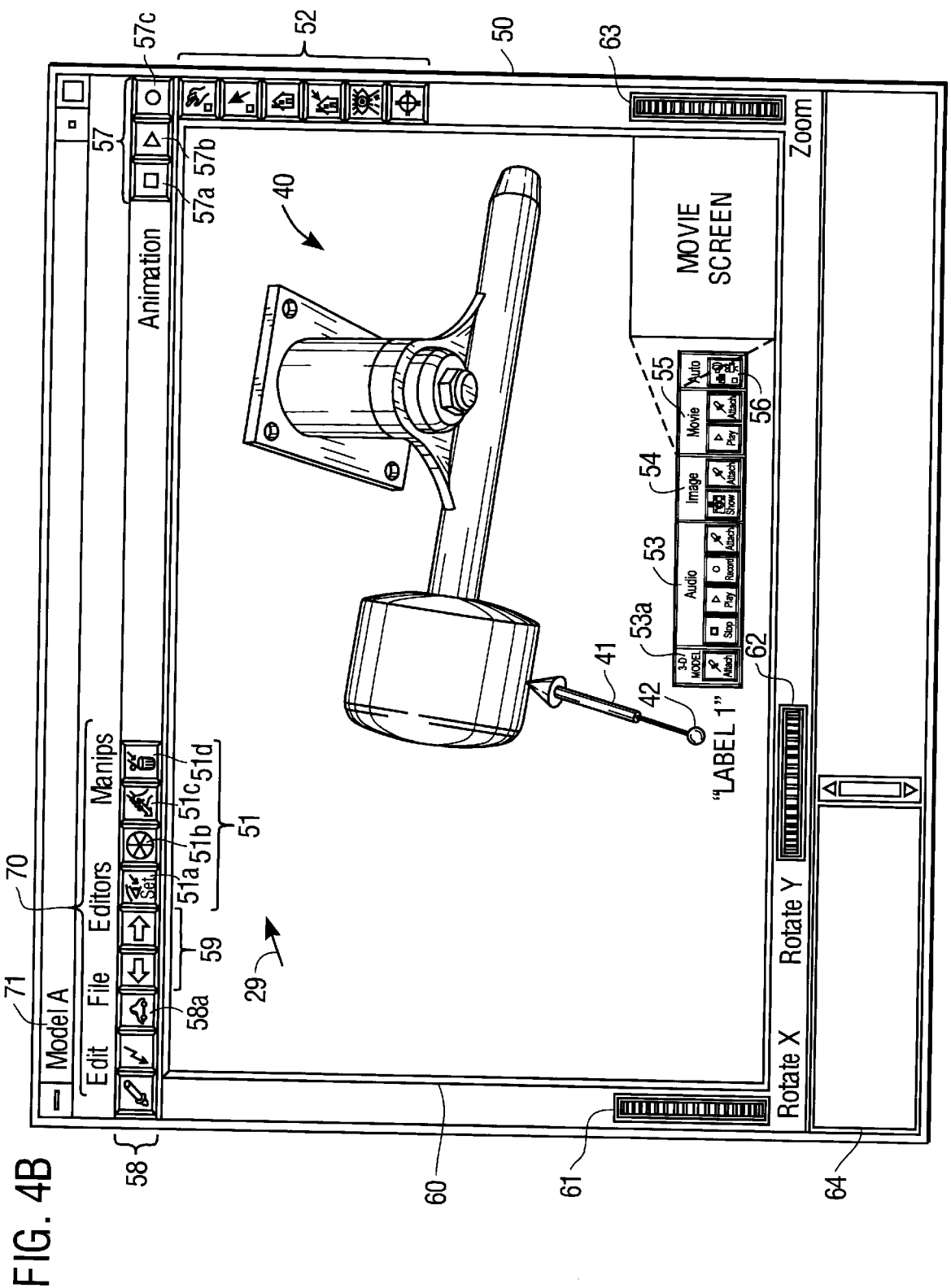
Figure 5:
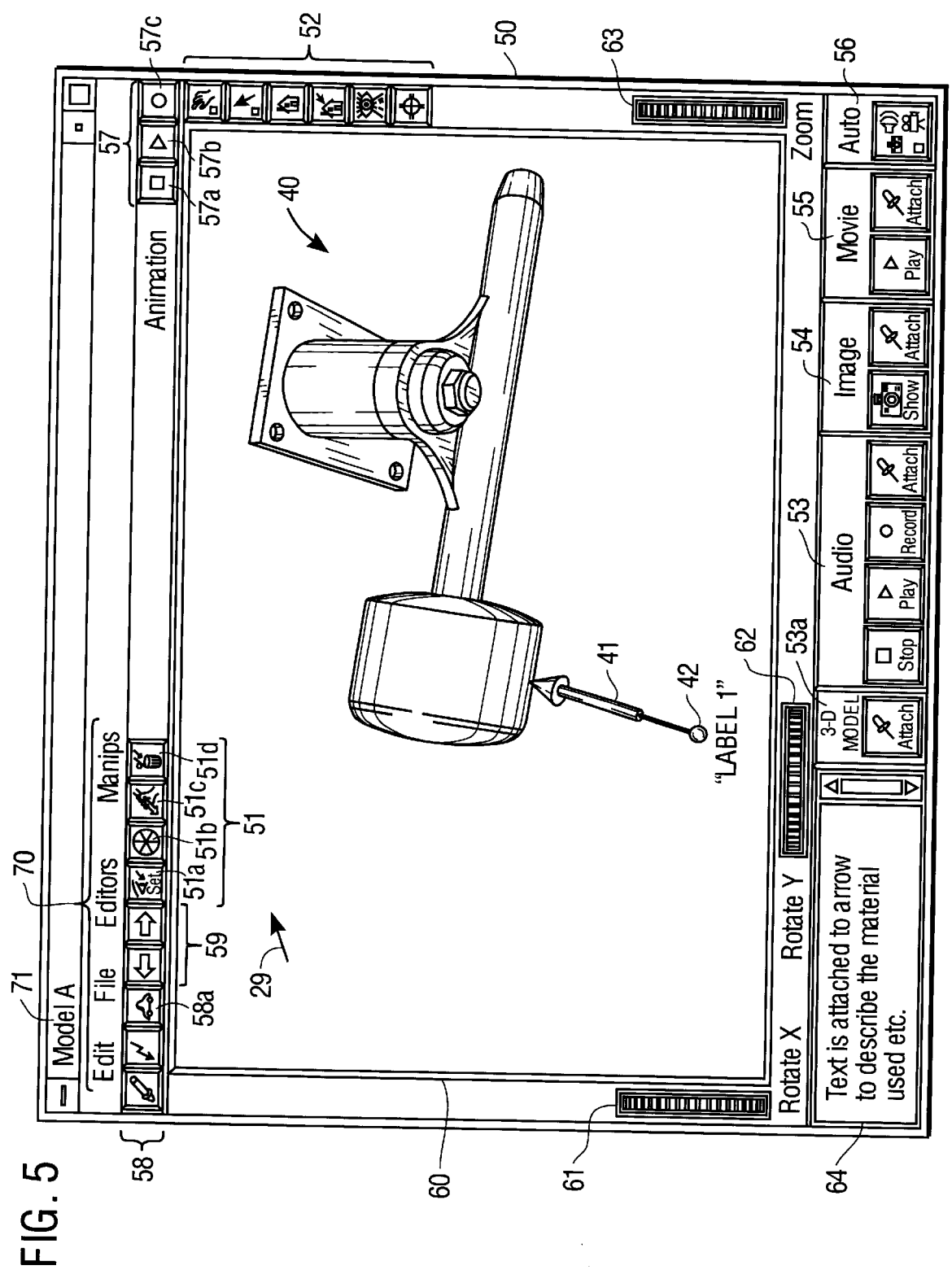
Figure 6:
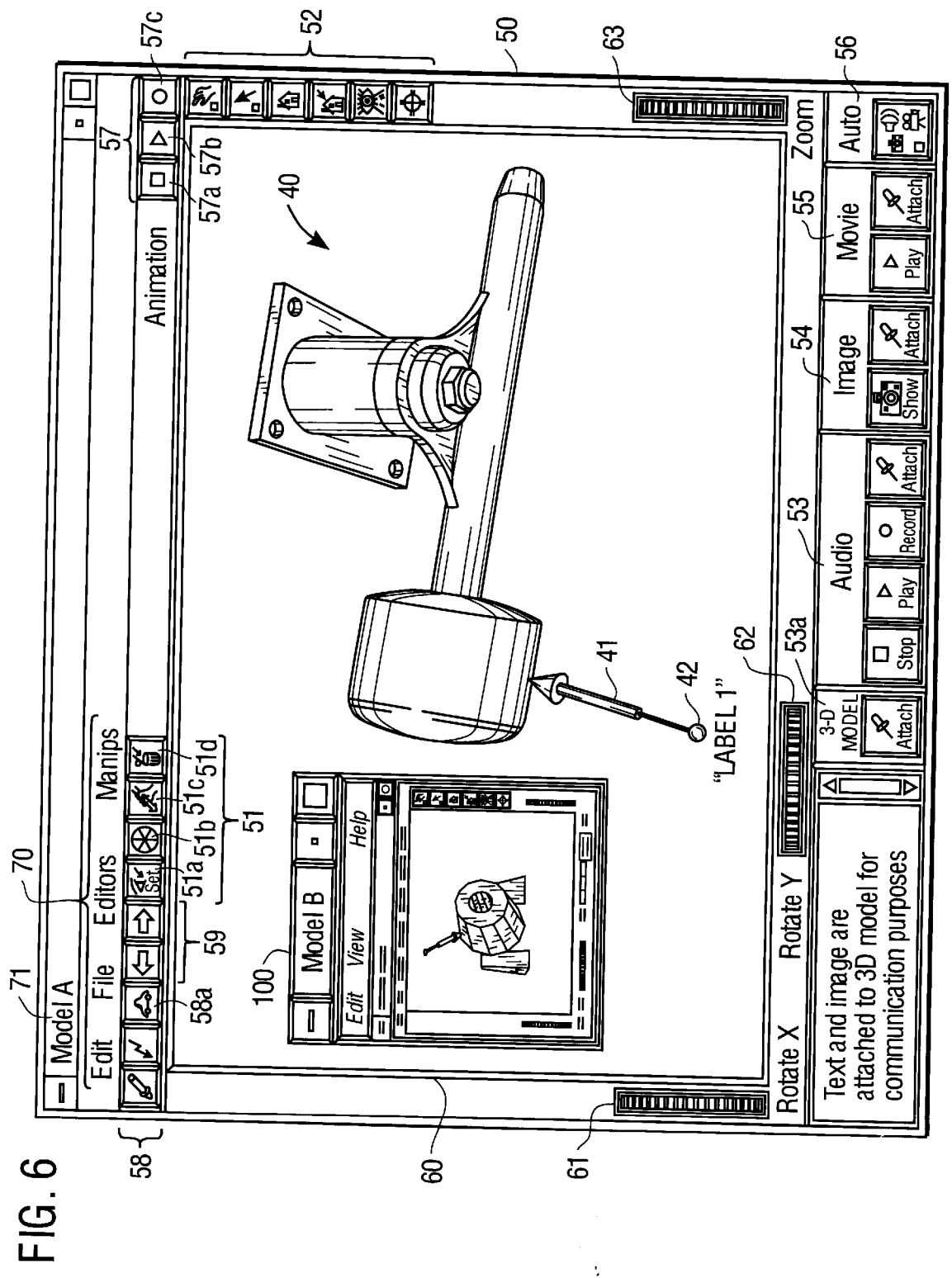

FIGS. 4A through 7 illustrate the annotation system of computer-controlled display system 20 of FIG. 3. As described above, the annotation system of the present invention is essentially a user interface of display system 20 of FIG. 3 that implements, among other functions, the annotation functions. Therefore, the annotation system of the present invention can also be referred to as an annotation user interface. Referring to FIGS. 4A–7, the annotation system includes a control frame 50 on display 22 of FIG. 3. Control frame 50 may fill substantially all or part of the display screen of display 22 of FIG. 3. Control frame 50 is the primary context for interacting with the annotation system of the present invention. Control frame 50 includes a display window 60 that displays 3-D model 40. Display window 60 can also display sub-windows within its frame in addition to 3-D model 40, for example sub-window 100 as shown in FIG. 6. 3-D model 40 displayed in display window 60 can be manipulated by control device 27 of FIG. 3 in all directions by known methods. Control device 27 can be any kind of cursor control device known in the art.

Sub-window 100 of FIG. 6 displays an image. In addition, sub-window 100 can display a movie, an animation, a text, or a 3-D model. Sub-window 100 in window 60 also supports multimedia environment. As can be seen from FIG. 6, sub-window 100 also includes control panels and menu bar panel for various control functions. Alternatively, sub-window 100 can exist as a separate window outside window 60. In addition, sub-window 100 can be merely an area inside display window 60 for displaying objects or images (e.g., see FIG. 4B).

Display window 60 also displays a pointer 41 pointing at model 40. Pointer 41 is created to annotate model 40. Pointer 41 and other pointers displayed are created using control device 27. Pointer 41 includes a marker 42. Each of the pointers also includes a text label to assist the user (see FIGS. 4A–7). The label text can be edited when the pointer is activated. Pointer 41 is displayed as a 3-D pointer. As shown in FIGS. 4A through 7, pointer 41 is a 3-D arrow pointing at an area of 3-D model 40. In addition, pointer 41 can take other shapes or forms. FIGS. 11 A through 11 C show three different types of pointers that can be used for pointer 41.

Moreover, pointer 41 can take the form of another 3-D model (e.g., the 3-D model shown in FIG. 6). The 3-D model used for pointer 41 can also be an annotated 3-D model. Further, the annotated 3-D model used as pointer 41 can be linked to model 40 in a recursive manner.

As shown from FIGS. 4A–7, pointers 41, 43, and 45–46 are pointing at model 40. Alternatively, some of pointers 41, 43, and 45–46 may be an independently shown object not pointing at model 40. For example, pointer 41 may be an annotated 3-D model not connected with model 40, yet still being associated with model 40.

Figure 7:
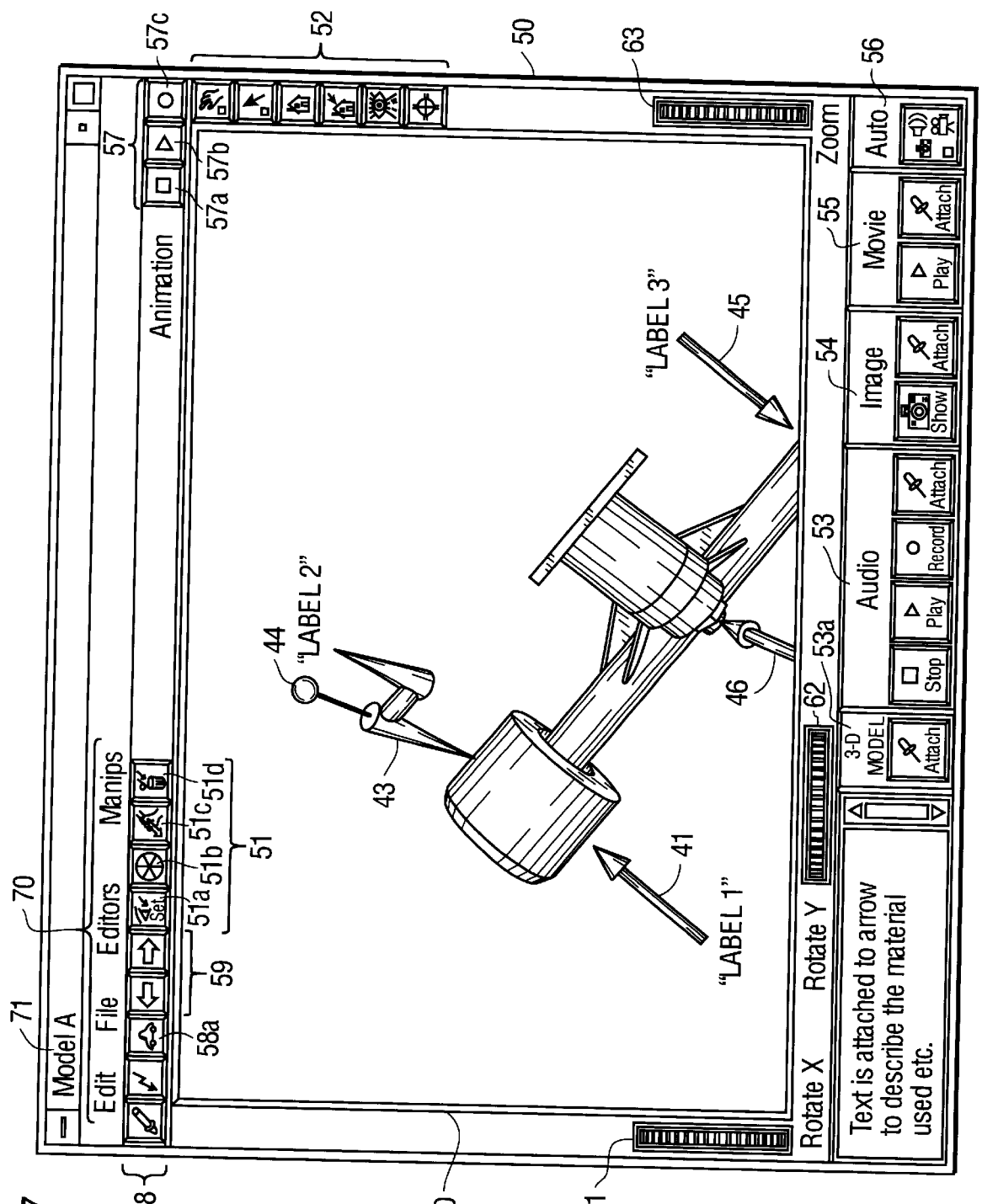

Marker 42 is used to indicate whether pointer 41 is an activated 25 pointer. When pointer 41 is not attached with marker 42 (as shown in FIG. 7), pointer 41 is a deactivated pointer. FIG. 7 also shows model 40 to be annotated by pointers 43 and 45–46. Pointer 45–46 are deactivated pointers and pointer 43 is an activated pointer with marker 44 attached.

Each of markers 42 and 44 takes the shape of a ball. Alternatively, each of markers 42 and 44 may be in other shapes. For example, a triangle may be used for marker 42 or 44. The creation of pointers 41, 43, and 45–46 and markers 42 and 44 to annotate model 40 and their manipulation will be described in more detail below.

Control frame 50 also includes a number of controls panels 51 through 59. Control frame 50 also includes control buttons 61 through 63. In addition, control frame 50 includes a text window 64 for displaying text. Control frame 50 also includes a menu bar panel 70. Menu bar panel 70 displays labels for pull down menus. All the control panels and buttons within control frame 50 can be accessed by control device 27 of FIG. 3. Control device 27 of FIG. 3 controls cursor 29 to select a control element within each of control panels 51–59 or select one of control buttons 61–63. Control device 27 then uses its signal generation devices to activate that selected element or button.

As can be seen from FIGS. 4A–7, control frame 50 also includes a file name area 71. File name area 71 displays the file name of 3-D model 40. The file name is used to identify the file of 3-D model 40. When the viewer wants to view a different model under a different file name, he or she can go to the "File" label of panel 70 to select and open the file in that file name.

Control buttons 61 and 62 are used to rotate model 40 in window 60. Control button 61 controls model 40 to rotate vertically. Control button 62 controls model 40 to rotate horizontally. Control button 63 is used to zoom in a particular portion of model 40. The particular portion of model 40 can be defined using control device 27 of FIG. 3.

Figure 11A:
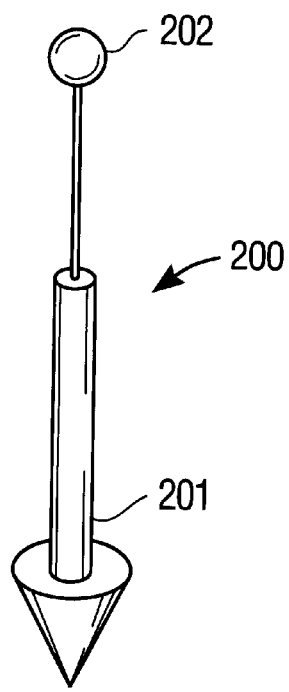
FIGS. 11A–11C show different types of pointers used by the annotation system to annotate the model displayed in FIGS. 4A–7.
Figure 11B:
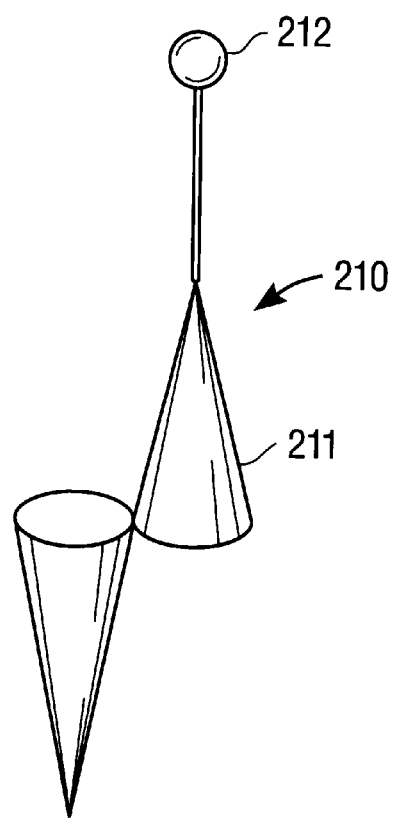
Figure 11C:
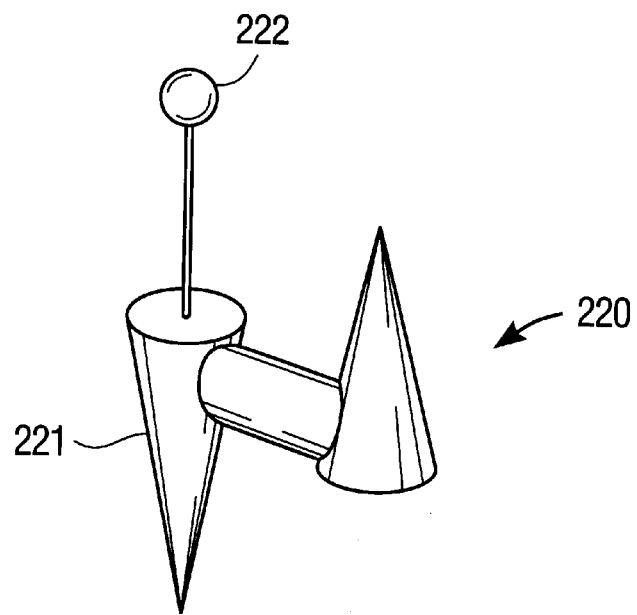

Control panel 52 includes six control elements that allow the user to select the type of cursor 29 and display modes of display window 60, etc. For example, when model 40 is annotated, model 40 can be displayed with or without the annotating pointers. Control panel 58 includes two control elements, each for selecting one type of pointer used to annotate 3-D model 40. Again, each of the control elements of control panel 58 can be selected by placing cursor 29 onto it using control device 27 of FIG. 3. FIGS. 4A–7 only illustrate two control elements for panel 58. Alternatively, panel 58 may include more than two control elements. FIGS. 11A through 11C illustrate three different types of pointers that can be used for pointer 41.

Control frame 50 also includes a control element 58a. Control element 58a is used to select a 3-D model as pointer 41 or other pointers. When control element 58a is activated, a list of 3-D model files will appear for selection for pointer 41 or other pointers. This allows the pointers to be selected from a variety of 3-D objects.

The type of pointer selected to annotate model 40 may also present information. For example, when the type of pointer shown in FIG. 11A is used, it can indicate that the multimedia function or functions linked to the pointer are normal. When the type of pointer of FIG. 11B is used, it indicates that the function or functions linked to the pointer are urgent.

Control panel 59 includes two control elements for moving 3-D model 40 left and right within display window 60. Control panel 51 is next to panel 59 and includes four control elements 51a–51d. These four control elements 51a–51d are used to set and manipulate pointer 41. Element 51a is used to set a pointer to point at model 40. Element 51b is used to select color of a pointer. Element 51c is used to allow manipulation of a pointer to point at model 40 at various angles. Element 51d is used to trash a pointer not in need.

Control panel 57 includes three control elements 57a–57c for controlling animation. Element 57a is used to stop the animation, element 57b is used to play the animation, and element 57c is used to record the animation.

Control panel 53 includes control elements of recording and playing audio information. Control panel 54 includes a control element for showing an image. Control panel 55 includes a control element for playing movie. Control panel 56 includes a control element for automatically recording a combination of audio, image, and movie information. Each of control panels 53–55 also includes a control element "Attach" for attaching a respective audio, image, or movie information to an activated pointer. The information recorded by control panel 56 can be attached to an activated pointer by the control element "Attach" of one of control panels 53–55. Control panel 53a includes a control element to attach a 3-D model file to an activated pointer. The "Attach" control element in each of control panels 53–56 allows the multimedia file to be attached to the activated pointer. When the "Attach" element is activated, a list of files that are of the same type will be shown. The viewer then can select the needed file to link to the activated pointer.

Alternatively, control panels 53 through 56 can be placed within display window 60, as shown in FIG. 4B, near a pointer. For example, control panels 53–56 can be placed near pointer 41. The activation of these buttons within control panels 53–56 in FIG. 4B remains the same as described above. In addition, control panels 53–56 may appear only after a pointer, for example pointer 41 is activated.

Text window 64 displays text documents. FIGS. 5–7 shows text window 64 displaying different texts.

The creation and manipulation of pointers 41, 43, 45 and 46 can be achieved by control device 27 of FIG. 3 as follows. For example, in order to generate pointer 41, control device 27 first causes cursor 29 to be placed on one of the control elements of control panel 58 to select the type of pointer 41 to be used for annotating model 40. After that, control device 27 moves cursor 29 to the position at which the pointer should be pointing at model 40. Control device 27 then generates a signal to generate the pointer where cursor 29 is located. Then, control device 27 moves cursor 29 to element 51a to set the pointer. Alternatively, control device 27 does not need to activate element 51a to set the pointer. In this case, control device 27 can use one of its signal generation devices to set the pointer. When a pointer is set, the pointer is attached to model 40. When model 40 moves or rotates, the pointer moves or rotates along with model 40. In other words, when a pointer is set, it is part of the model displayed.

When pointer 41 is initially created, pointer 41 is an activated pointer and marker 42 is attached to pointer 41, as can be seen in FIGS. 4A and 4B. In this case, after pointer 41 is set, a multimedia function can be linked to pointer 41. If pointer 41 is a deactivated pointer (i.e., pointer 41 is generated and then deactivated), then pointer 41 needs to be activated by attaching marker 42 to pointer 41. Marker 42 can be attached to pointer 41 by using the signal generation devices of control device 27. One embodiment of attaching marker 42 to pointer 41 so as to activate pointer 41 is to use control device 27 to place cursor 29 to the end of pointer 41. The user activates one of the signal generation devices on control device 27. This causes pointer 41 to be attached with marker 42. To deactivate pointer 41, cursor 29 is placed onto marker 42 by control device 27. Then the user activates one of the signal generation devices on control device 27. This cause marker 42 to be removed from pointer (see FIG. 7). When pointer 41 is not shown to be attached with marker 42, pointer 41 is deactivated.

When pointer 41 is activated, a multimedia function can be linked or attached to pointer 41. The attachment of a selected multimedia function or message can be achieved by activating the "attach" control element in the respective one of control panels 53–55. For example, if an audio message is required to be attached to pointer 41, the audio message is first recorded using control panel 53. Then the created audio message can be linked to pointer 41 by activating the "Attach" control element of control panel 53 such that when pointer 41 is later reactivated, the attached audio message is played.

In addition, the multimedia function linked to activated pointer 41, can be a particular view orientation or representation of model 40. The particular view orientation or representation of model 40 can be saved or locked-in using control panel 53a. The particular view orientation or representation of model 40 can also be saved using menu bar panel 70. The procedure to save a particular view of a 3-D model is known in the art, and will not be described in more detail below. The saved view can then be linked to activated pointer 41.

Moreover, the multimedia function linked to activated pointer 41 can also be an action to display different attributes (e.g., color) of model 40, an action to rotate model 40 to a different view orientation and representation, or an action to display a sequence of views representative of model 40.

The "Attach" control element is also implemented in the "Edit" label, for example, of menu bar panel 70. This allows the attachment of an existing multimedia file already created to be linked to pointer 41. In addition, an action such as running a program, saving a file, etc., can also be linked to activated pointer 41 in similar manner.

If a text is to be attached to pointer 41 when activated, the text can be created in window 64 (as shown in FIG. 5) and then attached to pointer 41. If the text to be attached has already been created under a file name the user can display the file in window 64 and attach the file to pointer 41 using menu bar panel 70.

For one embodiment, only one pointer can be an activated pointer at one time. For a further embodiment, an activated pointer can be attached with one multimedia function. For other embodiments, an activated pointer can be attached with more than one multimedia function.

When one or more multimedia functions are linked to activated pointer 41, pointer 41 then can be deactivated by removing marker 42 from pointer 41. When the viewer then needs to execute the multimedia function or functions linked to a pointer, for example pointer 41, the viewer then re-activates pointer 41 by attaching marker 42 to pointer 41. When pointer 41 is re-activated, all the "immediate" functions linked to pointer 41 will be executed immediately. An "immediate" function is an action that requires immediate execution. For example, an "immediate" function can be an action to play an audio message, or an action to run a program.

After the execution of all the "immediate" functions linked, all the "delayed" functions linked to pointer 41 now can be executed. The user simply uses the control function included in the control panels and buttons displayed on control frame 50 to execute the "delayed" multimedia functions.

Alternatively, some of the "immediate" functions linked to pointer 41 or other pointers may also require control from some of the control panels or buttons displayed on control frame 50.

Referring to FIG. 8, the data structure 130 of an annotated 3-D model is illustrated. As can be seen from FIG. 8, data structure 130 is a hierarchical data structure. Alternatively, other types of data structures can be used for data structure 130. For example, data structure 130 can be a closed loop data structure of a semi-hierarchical and semi-closed-loop data structure.

Data structure 130 includes a trunk group 131 as root of the hierarchical data structure. Trunk group 131 is linked to sub-trunk groups 132 and 133, and other sub-trunk groups (not shown in FIG. 8). FIG. 8 only illustrates two sub-trunk groups 132 and 133 linked to trunk group 131. In practice, many more sub-trunk groups are linked to trunk group 131.

Trunk group 131 may or may not describe or define a surface point of the 3-D model. When trunk group 131 does not define a surface point of the 3-D model, trunk group 131 is only linked to sub-trunk groups. When trunk group 131 defines a surface point of the 3-D model, trunk group 131 is linked not only to sub-trunk groups, but also to attributes that describe characteristics of the surface point to be displayed. As will be described below, the attributes include a color attribute that describes the color of the surface point, a geometry attribute that describes the geometrical feature of the surface point, and a position attribute that describes the position of the surface point.

Likewise, the sub-trunk groups that are linked to trunk group 131 can also define or describe a surface point of the 3-D model. As can be seen from FIG. 8, sub-trunk group 132 defines a surface point of the 3-D model and sub-trunk group 133 does not define a surface point of the 3-D model. This causes sub-trunk group 132 to be linked to attributes 132a through 132c and sub-trunk group 133 to be linked to branch groups 134 and 135. Attribute 132a is a color attribute, attribute 132b is a position attribute, and attribute 133c is a geometry attribute.

FIG. 8 only illustrates two branch groups 134 and 135 linked to sub-trunk group 133. In practice, many more branch groups may be linked to sub-trunk group 133. In addition, FIG. 8 only illustrates sub-trunk group 132 defining a surface point. In practice, many more sub-trunk groups that are linked to the trunk group are also defining surface points.

In addition to be linked to attributes 132a–132c, sub-trunk group 132 may also be linked to a branch group. FIG. 8 only illustrates sub-trunk group 132 being linked to attributes 132a–132c. When sub-trunk group 132 defines a surface point and is linked to a branch group, that branch group defines a pointer pointing at the surface point defined by sub-trunk group 132.

Branch group 134 is linked to attributes 134a through 134c and a sub-branch group 136. Branch group 134 defines a surface point and attributes 134a–134c include a color attribute 134a, a position attribute 134b, and a geometry attribute 134c. Branch group 135 also defines a surface point and is linked to attributes 135a–135c.

Because sub-branch group 136 is linked to branch group 134 which defines a surface point, sub-branch group 136 therefore defines a pointer pointing at the surface point defined by branch group 134. As can be seen from FIG. 8, sub-branch group 136 is linked to attributes 136a–136c. Those attributes describe the pointer defined by sub-branch group 136. In addition, sub-branch group 136 is also linked to a fourth attribute 140. This attribute 140 is an attachment attribute that describes which of the multimedia functions 140a through 140n is or are linked to sub-branch group 136. Attribute 140 is not linked to any of multimedia functions 140a–140n when the pointer defined by sub-branch group 136 is not linked to any multimedia function.

FIG. 9 illustrates the process of annotating a displayed 3-D model and linking multimedia functions to the annotated 3-D model employing the annotation system described above, in connection with FIGS. 4A–7. Referring to FIG. 9, the process starts at step 150. At step 151, the 3-D model data file is read and displayed on display 22 (FIG. 3). At step 152, the type of pointer to be used to annotate the 3-D model is chosen. As described above with respect to FIGS. 4A–7, the pointer used to annotate a 3-D model can be of different types. FIGS. 11A through 11C illustrate three different types of pointers. Each type of pointer can present information with respect to the function linked to the pointer. For example, when the type of pointer as shown in FIG. 11A is selected at step 152, it indicates that the function or functions to be linked to the pointer are normal functions. When the type of pointer of FIG. 11B is selected at step 152, it indicates that the function or functions to be linked to the pointer are urgent functions. When, for example, the type of pointer as shown in FIG. 11C is selected at step 152, it indicates that the function or functions to be linked to the pointer are important functions.

Referring again to FIG. 9, when the type of pointer is selected, the process then moves to step 153 at which the pointer is placed with respect to the 3-D model. The pointer is positioned to point at the surface area of interest of the 3-D model perpendicularly. At step 154, a judgment is made to determine if orientation of the pointer is needed. If the answer is yes, then step 155 is performed at which the pointer is oriented to a desired angle. The process then moves to step 156.

If, at step 154, it is determined that orientation of the pointer is not needed, then step 156 is performed at which the pointer is activated by attaching a marker (e.g., a ball) to an end of the pointer as shown in FIGS. 4A–7. In addition, the multimedia function to be attached to the activated pointer is also determined at step 156.

If, at step 156, the multimedia function is determined to display a multimedia information, then step 157 is the next step. At step 157, the media type of the information is selected. The process then links the message in the selected media at one of steps 158a through 158n. For example, if, at step 157, the media type is determined to be plain text, then step 158a is performed to attach the text to the activated pointer. If, however, the media type is a movie, then step 158c is executed to link the movie to the activated pointer.

If, at step 156, the multimedia function is determined to be a multimedia action, then one of steps 159 through 160n is the next step from step 156. Steps 159–160n illustrate some multimedia actions. For example, step 159 links an action to change a page of a document to the activated pointer. Step 160 links an action to record a view and attach the recorded view to the pointer to the activated pointer. Step 160a links an action to run a program to the activated pointer.

After a selected multimedia function is linked to the pointer at one of steps 158a–158n and 159–160n, step 161 is then performed at which a judgment is made to determine if another function needs to be linked to the activated pointer. If the answer is yes, the process returns to step 156. If the answer is no, step 162 is then performed at which the pointer is deactivated by removing the marker from the pointer. Step 163 is then performed to determine if further annotation of the 3-D model is needed. If the answer is yes, then the process returns to step 152 to continue annotating the 3-D model. If the answer is no, then the process ends at step 164.

FIG. 10 illustrates the process of displaying an annotated model and executing the multimedia functions linked to the annotated model using the annotation system described above, in connection with FIGS. 4A–7. Referring to FIG. 10, the process starts at step 170. At step 171, the data file of an annotated 3-D model is read and displayed on display 22 of FIG. 3. At step 172, an annotating pointer is selected and activated. To activate a selected pointer, a marker (e.g., ball) is attached to the selected pointer. Next, step 173 is performed at which all "immediate" multimedia functions linked to the selected pointer are executed. An "immediate" function is a multimedia function that is linked to the selected pointer at one of steps 158a–158n and 159 through 160n of FIG. 9. In other words, an "immediate" function requires an immediate execution of the function. For one embodiment, the "immediate" functions only include some of the actions within steps 159 through 160n.

Step 174 is then performed to determine if there is any "delayed" function linked to the selected pointer. A "delayed" function can be to present a linked multimedia information or an action that requires further activation. If, at step 174, it is determined that there is no "delayed" action, then step 178 is performed. If it is determined that a "delayed" function is linked to the selected pointer, then steps 175 and 176 are performed to execute the delayed function. For example, if the linked information to the pointer is an audio information, then the audio information is played. If the linked information is a text or an image, then the text or image is displayed. The process then moves to step 177.

At step 177, a judgment is made to determine if the selected pointer has any other "delayed" function to be executed. If the answer is positive, then steps 175 and 176 are again executed. If the answer is no, then step 178 is performed.

At step 178, a judgment is made to determine whether further activation of a particular pointer is needed. If the answer is yes, the process goes to step 172. If the answer is no, the process ends at step 179.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer implemented method of annotating a geometric figure by associating multimedia functions with the geometric figure, for use with a computer system including a display and a user input control device, said method comprising the steps of:
   (a) displaying the geometric figure on the display, the geometric figure being interactively manipulable in three dimensions in response to the user input control device;
   (b) displaying a pointing icon on the display;
   (c) interactively positioning the pointing icon at a desired three-dimensional location relative to the geometric figure, wherein the pointing icon moves with the geometric figure when the geometric figure is manipulated in three dimensions;
   (d) associating a specified multimedia function with the pointing icon;
   (e) interactively activating the pointing icon; and
   (f) in response to the activating of the pointing icon, performing the specified multimedia function associated with the pointing icon.

2. The method of claim 1, further including the steps of interactively manipulating the geometric figure in three dimensions under control of the user input control device, and redisplaying the pointing icon so that the desired three-dimensional location of the pointer icon relative to the geometric figure is maintained.

3. The method of claim 1, wherein the specified multimedia function includes displaying a sequence of one or more specified three dimensional view orientations of the geometric figure.

4. The method of claim 1, wherein the specified multimedia function includes rotating the geometric figure in three-dimensional space.

5. The method of claim 1, wherein the specified multimedia function includes altering one or more specified display attributes of the geometric figure.

6. The method of claim 1, wherein the specified multimedia function includes displaying a specified text.

7. The method of claim 1, wherein the specified multimedia function includes displaying a sequence of one or more specified images.

8. The method of claim 1, wherein the pointing icon conveys information about the specified multimedia function associated with the pointing icon.

9. A computer implemented method of annotating a geometric figure, comprising the steps of:
  (a) displaying the geometric figure in three-dimensional representation on a display of a computer system;
  (b) displaying a pointer on the display, wherein the pointer is also displayed in three-dimensional representation on the display;
  (c) positioning the pointer at any of a plurality of three-dimensional displayable areas of the geometric figure; and
  (d) orienting the pointer such that the pointer can point at the area of the geometric figure at a desired angle, wherein the pointer can be oriented at one of a plurality of desired angles for a given location of the pointer on the display.

10. A display system, comprising:
  a cursor control device;
  a display coupled to the cursor control device;
  a processor coupled to the cursor control device and the display; and
  a memory coupled to the processor, wherein the memory stores first data for displaying a three-dimensional geometric figure on the display, wherein the three-dimensional geometric figure is manipulable in three dimensions in response to the cursor control device, wherein the memory stores second data for displaying a pointer icon, wherein the pointer icon is manipulable by the cursor control device to point at a three-dimensional location relative to the three-dimensional figure wherein the pointing icon moves with the three-dimensional geometric figure when the three-dimensional geometric figure is manipulated in three dimensions. and wherein the second data is linked to a multi-media function so that when the pointer is activated the multi-media function is performed.

11. In a computer system including a cursor control device, a display, and a processor, an apparatus for associating multimedia functions with a three-dimensional geometric figure:
  means for associating a pointer icon with the three-dimensional geometric figure displayed and manipulable in three-dimensions on the display;
  means for positioning the pointer icon at a three-dimensional location relative to the three-dimensional geometric figure using the cursor control device, wherein the pointing icon moves with the three-dimensional geometric figure when the three-dimensional geometric figure is manipulated in three dimensions; and
  means for attaching the multi-media function to the pointer icon such that the multi-media function is performed in response to activating the pointer icon using the cursor control device.

* * * * *